(12) United States Patent
Heinikoski et al.

(10) Patent No.: US 10,812,311 B2
(45) Date of Patent: Oct. 20, 2020

(54) METHOD AND NETWORK NODE FOR FFT BASED POWER DETECTION FOR LBT IN LTE LAA

(71) Applicant: Telefonaktiebolaget LM Ericsson (publ), Stockholm (SE)

(72) Inventors: Kauko Heinikoski, Oulu (FI); Marko E. Leinonen, Haukipudas (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/757,764

(22) PCT Filed: Sep. 7, 2015

(86) PCT No.: PCT/SE2015/050942
§ 371 (c)(1),
(2) Date: Mar. 6, 2018

(87) PCT Pub. No.: WO2017/044015
PCT Pub. Date: Mar. 16, 2017

(65) Prior Publication Data
US 2018/0351774 A1    Dec. 6, 2018

(51) Int. Cl.
*H04L 27/26* (2006.01)
*H04L 12/413* (2006.01)
(Continued)

(52) U.S. Cl.
CPC ............ *H04L 27/265* (2013.01); *H04L 5/001* (2013.01); *H04L 12/413* (2013.01);
(Continued)

(58) Field of Classification Search
CPC ..... H04L 27/265; H04L 5/001; H04L 12/413; H04L 27/0006; H04W 16/14; H04W 24/08; H04W 74/0808
See application file for complete search history.

(56) References Cited

U.S. PATENT DOCUMENTS

2006/0182169 A1\*  8/2006  Belge ...................... H04B 3/46
                                                                    375/222
2009/0092193 A1\*  4/2009  Fujita .................. H04L 27/2647
                                                                    375/260
(Continued)

FOREIGN PATENT DOCUMENTS

EP    2 661 035 A1    11/2013
EP    2 717 528 A1    4/2014

OTHER PUBLICATIONS

Mishra, S. M. et al., "Detect and Avoid: An Ultra-Wideband/WiMAX Coxistence Mechanism", IEEE Communications Magazine, vol. 45, nr 6, Jun. 2007, pp. 68-75.
(Continued)

*Primary Examiner* — Christopher M Crutchfield
*Assistant Examiner* — Tito Q Pham
(74) *Attorney, Agent, or Firm* — Sage Patent Group

(57) ABSTRACT

A method performed in a radio access node includes the radio access node receiving a data for transmission to a second radio access node over a communication channel having an unlicensed spectrum. The method further includes, in response to receiving the data, the radio access node receiving a channel measurement signal over the communication channel. The method further includes the radio access node performing an N-point Fast Fourier Transform (FFT) on the channel measurement signal to produce a frequency domain signal with N bins. The method further includes the radio access node performing a power measurement on the frequency domain signal. The method further includes the radio access node analyzing the power measurement of the frequency domain signal. The method further includes the radio access node transmitting the data based on the analysis of the power measurement.

12 Claims, 13 Drawing Sheets

(51) Int. Cl.
H04W 74/08 (2009.01)
H04L 5/00 (2006.01)
H04L 27/00 (2006.01)
H04W 16/14 (2009.01)
H04W 24/08 (2009.01)

(52) U.S. Cl.
CPC ......... *H04L 27/0006* (2013.01); *H04W 16/14* (2013.01); *H04W 24/08* (2013.01); *H04W 74/0808* (2013.01)

(56) References Cited

U.S. PATENT DOCUMENTS

| | | | | |
|---|---|---|---|---|
| 2013/0250969 | A1* | 9/2013 | Hui | H04B 3/54 370/437 |
| 2014/0269524 | A1* | 9/2014 | Xiao | H04W 74/0825 370/329 |

OTHER PUBLICATIONS

International Search Report and Written Opinion issued in International Application No. PCT/SE2015/050942, dated May 20, 2016, 12 pages.
Extended European Search Report dated Mar. 26, 2019 issued for European Patent Application No. 15903697.9, 8 pages.
Quan, Z. et al., "Wideband Spectrum Sensing in Cognitive Radio Networks", arXiv:0802.4130v1 [cs.IT], ARXIV.ORG, Cornell University Library, Ithaca, NY, Feb. 28, 2008, 6 pages.
Yan, Y. et al., "Energy Detection of Narrowband Signals in Cognitive Radio Systems", Wireless Communications and Signal Conference on, IEEE, Piscataway, NJ, Oct. 21, 2010, 5 pages.

* cited by examiner

METHOD AND NETWORK NODE FOR FFT BASED POWER DETECTION FOR LBT IN LTE LAA

CROSS REFERENCE TO RELATED APPLICATION(S)

This application is a 35 U.S.C. § 371 National Stage of International Patent Application No. PCT/SE2015/050942, filed Sep. 7, 2015, designating the United States, the disclosure of which is incorporated by reference.

TECHNICAL FIELD

This disclosure relates generally to listen before talk (LBT) functionality and, more particularly, to methods and network nodes for FFT based power detection for LBT in Long Term Evolution (LTE) License Assisted Access (LAA).

BACKGROUND

LBT (Listen Before Talk) functionality for any communication method, for example LAA (License Assisted Access), requires fast power detection for selected channel/channels need to be done fast. The radio transmitter needs to detect prior the transmission that the frequency channel is free from other transmissions. This kind of LBT functionality is required by regulatory bodies for radio apparatuses which are operating at unlicensed frequency bands like Wifi radios. Using WiFi as a reference, targets for the tightest LBT timing requirement is 9 us. That is, there is only 9 us available to perform clear channel assessment (CCA). FIG. 1 illustrates a timing budget in which using traditional channelization and measurement for each channel individually may take at least 10 us, which does not meet tightest timing requirement for LBT functionality.

Furthermore, when a LTE LAA UE is using a primary carrier with a licensed spectrum, LBT functionality is mandatory to have good co-existence with other communication systems like Wifi, radar systems, etc. Additionally, a regulatory body like ETSI requires mandatory LBT functionality for 5 GHz operation, which has already been implemented for Wifi. However, when the UE is using a secondary carrier with an unlicensed spectrum, LBT functionality is not available, which leads to a degradation in network performance.

SUMMARY

According to some embodiments, a method performed in a radio access node includes the radio access node receiving a data for transmission to a second radio access node over a communication channel having an unlicensed spectrum. The method includes, in response to receiving the data, the radio access node receiving a channel measurement signal over the communication channel. The method includes the radio access node performing an N-point Fast Fourier Transform (FFT) on the channel measurement signal to produce a frequency domain signal with N bins. The method includes the radio access node performing a power measurement on the frequency domain signal. The method includes the radio access node analyzing the power measurement of the frequency domain signal. The method further includes the radio access node transmitting the data based on the analysis of the power measurement.

In some embodiments, a radio access node includes a processor and a computer readable medium coupled to the processor, the computer readable medium containing instructions executable by the processor. The radio access node is operative to receive a data for transmission to a second radio access node over a communication channel having an unlicensed spectrum. The radio access node is operative to, in response to receiving the data, receive a channel measurement signal over the communication channel. The radio access node is operative to perform an N-point Fast Fourier Transform (FFT) on the channel measurement signal to produce a frequency domain signal with N bins. The radio access node is operative to perform a power measurement on the frequency domain signal. The radio access node is operative to analyze the power measurement of the frequency domain signal. The radio access node is further operative to transmit the data based on the analysis of the power measurement.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
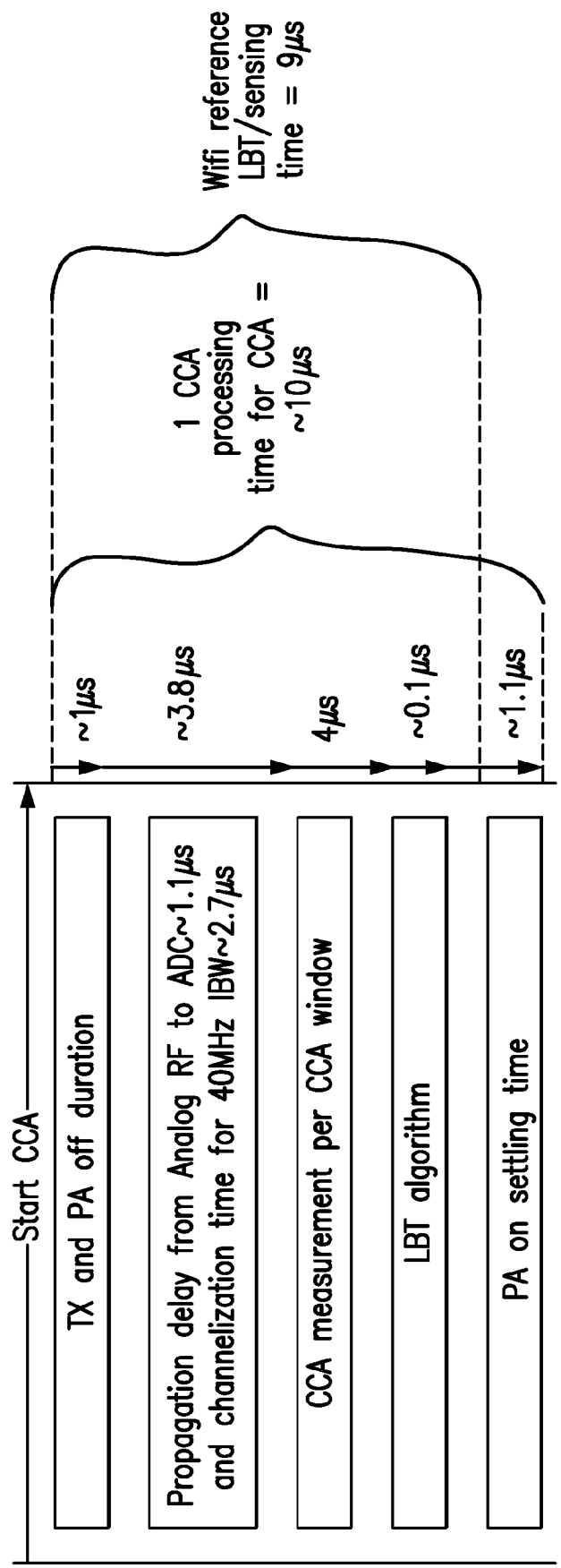
FIG. 1 is an illustration of a timing budget.
Figure 2:
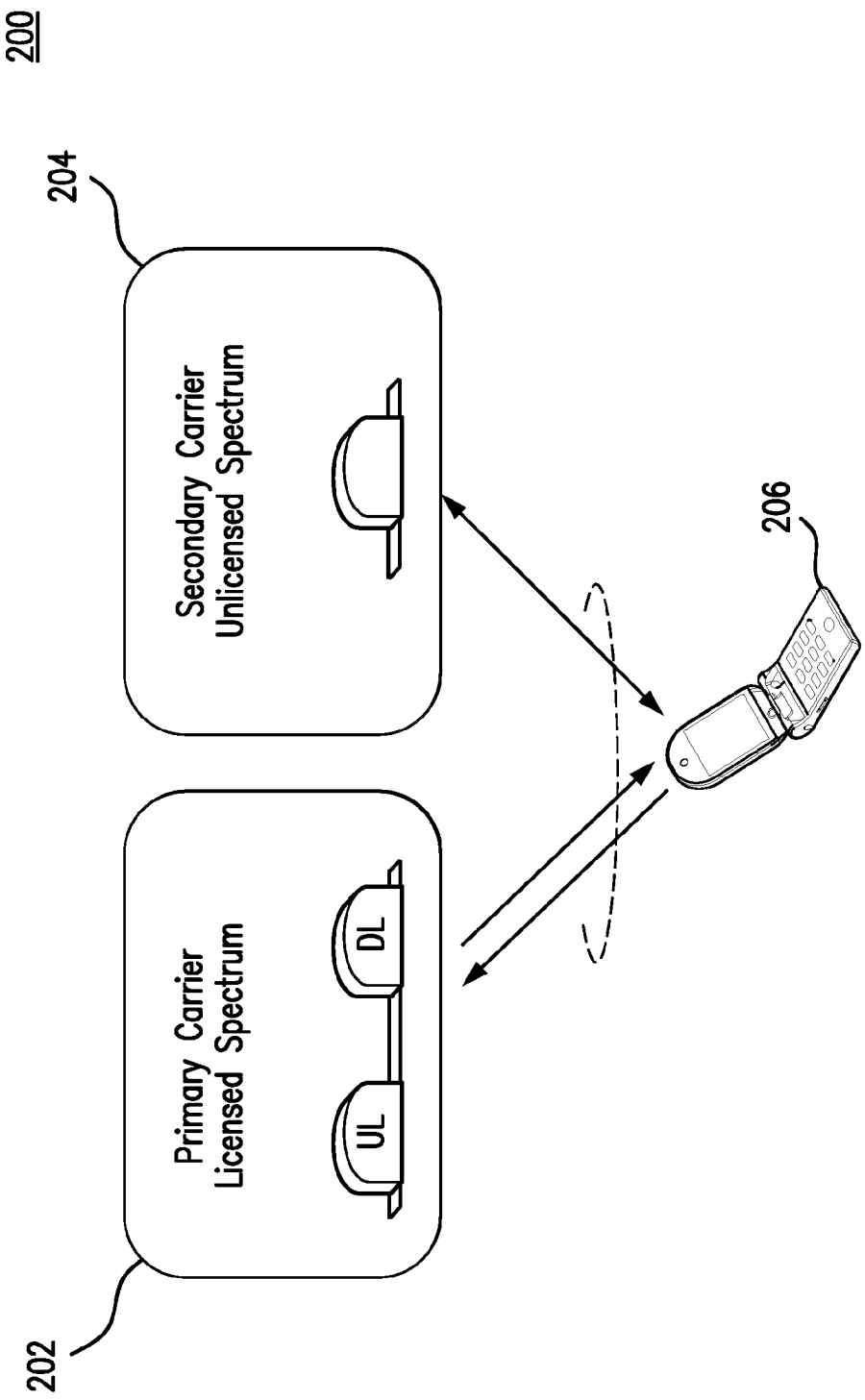
FIG. 2 is an illustration of an air interface according to exemplary embodiments.

FIG. 2 illustrates an embodiment of an air interface 200 for LTE-U. As illustrated in FIG. 2, mobile terminal (UE) 206 is connected to LTE network via two air-interfaces: the primary carrier 202, which may be at a 3GPP frequency band, and a Secondary Carrier 204, which is at unlicensed frequency band (e.g., ISM band). In some embodiments, the secondary Carrier operates as a Supplemental Downlink (SDL) mode, where there is only transmission data to the downlink (DL) direction or from a Radio Base Station (RBS) to User Equipment (UE), only. The primary carrier

202 may be LTE FDD or TDD, and it provides control signaling, mobility and user data while the secondary carrier uses unlicensed spectrum with best-effort user data in the DL, and in uplink (UL) data (e.g., from UE to RBS), also. In some embodiments, SDL band may be used as a bi-directional communication channel as demonstrated by the two headed arrow between secondary carrier 204 and UE 206.

Figure 3:
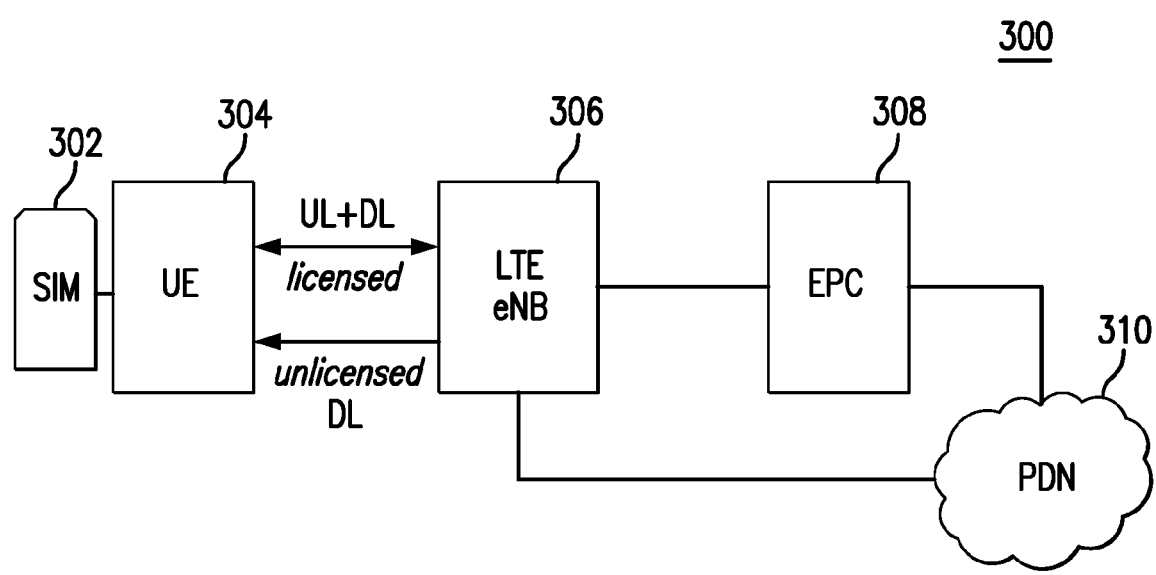
FIG. 3 is an illustration of a wireless communication system in accordance with exemplary embodiments.

FIG. 3 illustrates an embodiment of a wireless communication system 300. The communication system includes a UE 304 connected to a SIM 302. The UE 304 may be in communication with an access node 306 using a primary licensed carrier for uplink and downlink transmissions, and a secondary unlicensed carrier for downlink transmissions. The access node 306 may be in communication with an Evolved Packet Core (EPC) network 308. Both the access node 306 and 308 may be in communication with a Packet Data Network 310.

In some embodiments, the access node is an LTE eNB. The LTE RBS 306 may be a dual band RBS, where as an example, the 1st operational band (PCell) is operating at 3GPP band 4 (transmission and reception) and the SDL is for DL (Transmission) at 5725-5850 MHz, and this frequency can be also used by 5 GHz WiFi. Furthermore the access node 306 may be, a WLAN Access Point, relay node, or gateway type device, and is capable of communicating with device 304, along with any additional elements suitable to support wireless communication between wireless communication devices or between a wireless communication device and another communication device, such as landline telephone.

Examples UE's 304 include, but are not limited to, personal digital assistants, electronic readers, portable electronic tablets, wireless sensors, machine communication devices, personal computers, relay node, and laptop computers. The UE 304 may be a legacy UE.

According to some embodiment, a LBT power measurement such as a clear channel assessment (CCA), is performed with a Fast Fourier Transformation (FFT) based method. For example, a received digitalized signal from an Analog Digital Converter (ADC) interface is processed with a fast FFT implementation. The FFT based method converts the received time domain signal to frequency domain signal. From this frequency domain signal, the detection signal strengths of each frequency is significantly improved.

In some embodiments, for example, a 128-point FFT is implemented, which would end up at ~1 MHz FFT bin width with a 122.88 Msps sample rate. A bin width of FFT result is a sample rate divided by a number of points used in FFT and this holds for complex signals. The number of points in FFT may be selected how accurate spectral analysis is needed to be performed. If more accurate spectral analysis is needed then number of point is increased and typically this is done as a ratio of power of two. The output of the FFT may be further processed to calculate signal power over a desired bandwidth by grouping needed signal points. For example, for a 20 MHz LTE channel, there is signal content at ~18 MHz, and thus, 18 frequency bins would be selected for integration or summing up the signal levels of 18 bins. Several results would be available simultaneously (e.g., up to five 20 MHz channels would fit to 122.88 MHz Nyquist window) to be processed at the one time.

Figure 4:
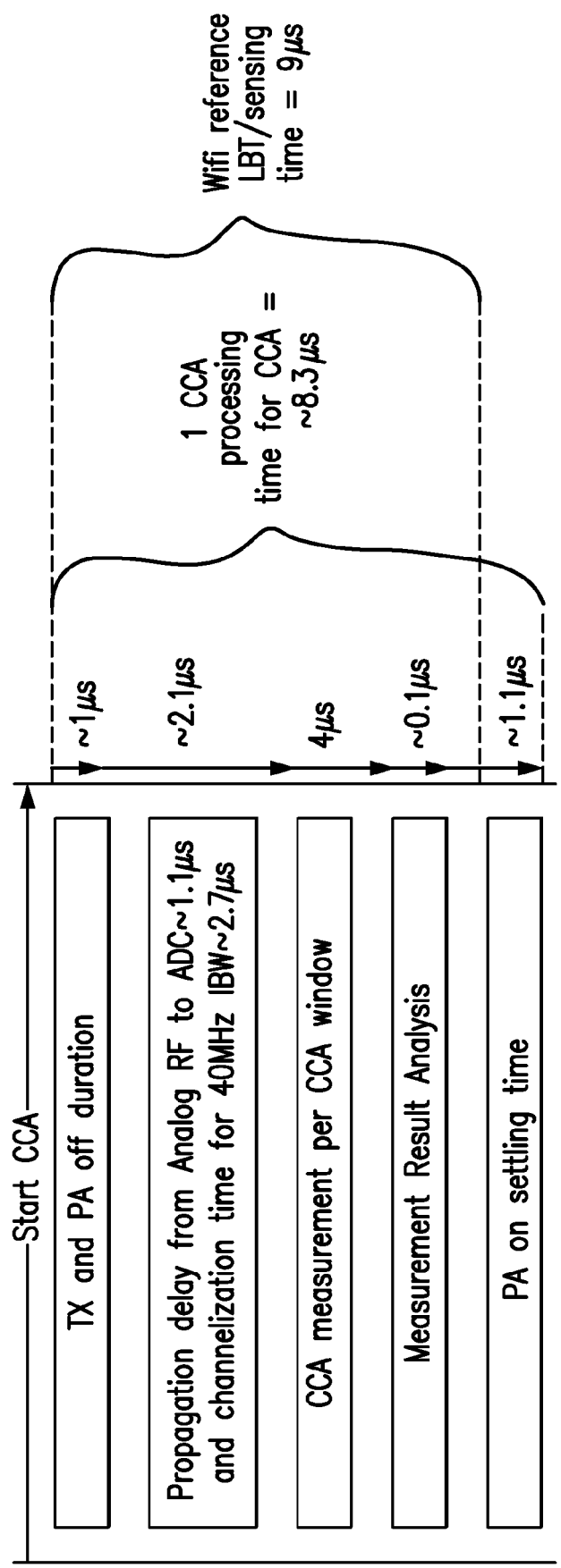
FIG. 4 illustrates a timing budget in accordance with exemplary embodiments.

FIG. 4 illustrates an embodiment of a timing budget using an FFT based method for LBT algorithm. As illustrated in FIG. 4, the time for a radio transmitter and a power amplifier shut down time (400) is approximately 1 us. A propagation delay via an analog RF detection receiver and an analog to digital converter and FFT based power measurement is shown in block (402) which is approximately 2.1 us. The clear channel assessment (CCA), which is a power measurement analysis based on FFT results, is shown in block (404) takes approximately 4 us. The measurement result analysis 406 (e.g., averaging or statistical analysis) algorithm takes approximately 01 us. Furthermore, after measurement analysis is performed, the settling time for radio transmitter and power amplifier is approximately 1.1 us. Thus, the time budget using an FFT based method for LBT is approximately 8.3 us, which is within the 9 us timing budget.

According to some embodiments, frequency selective LBT power measurement (CCA) is done with FFT based power measurement.

Figure 5:
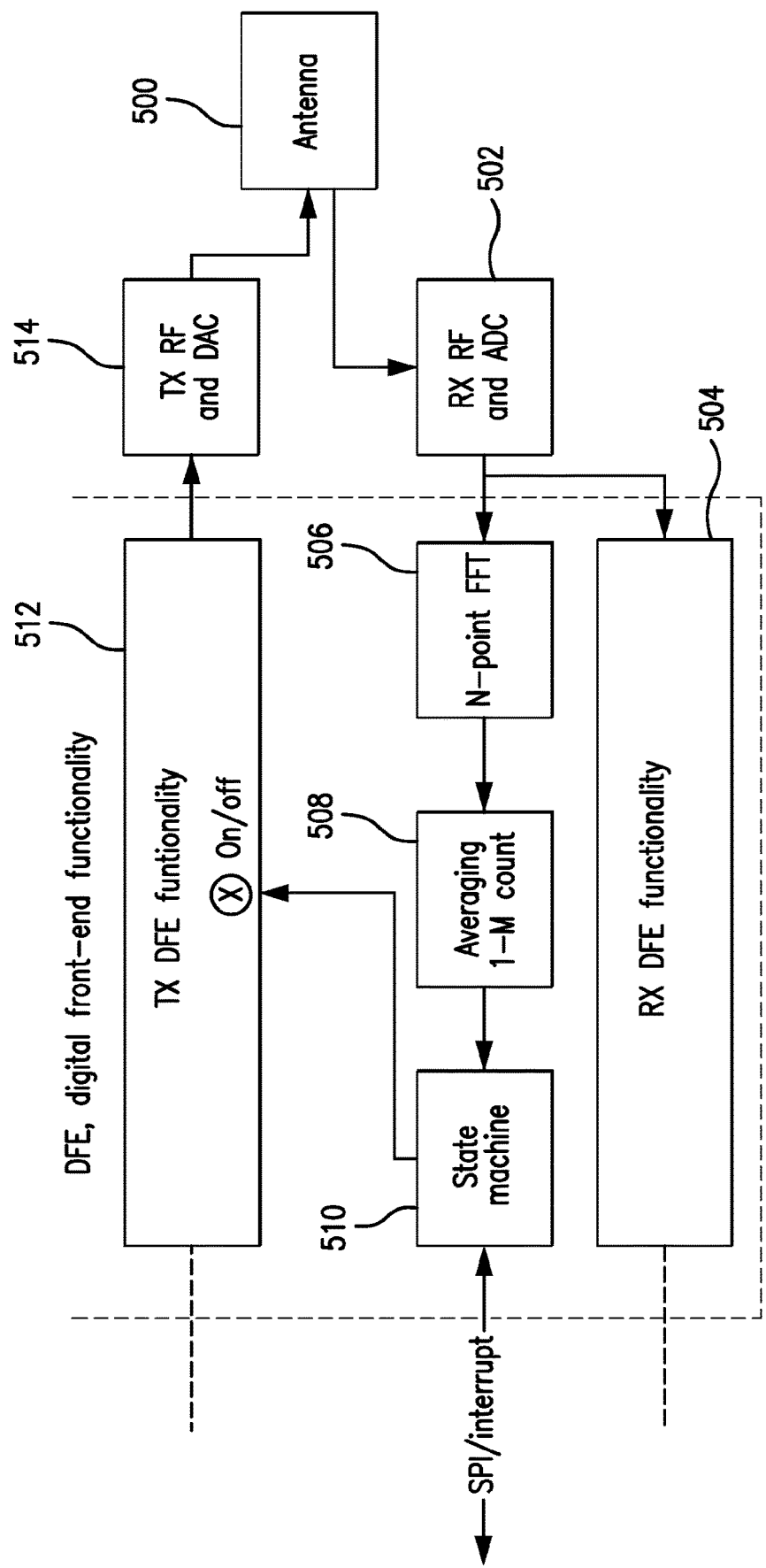
FIG. 5 illustrates a base station in accordance with exemplary embodiments.

FIG. 5 illustrates an embodiment of an FFT implementation in a network node implementing the LBT algorithm. The network node includes an antenna 500 that receives a signal transmitted over a channel. The received signal is passed through a detection receiver and ADC 502 that digitizes the received signal. The digitized signal is passed to an FFT processor 506 that performs an N-point FFT to produce a frequency domain signal. The output of the ADC is passed to the RX DFE Functionality 504. The RX DFE 504 is a Receiver Digital Front-End which includes a digital filtering, an automatic gain control, timing control(s) for the reception signal and other needed digital signal processing for the signal reception. The frequency domain signal is passed to an Averaging 1-M count 508 in which the N-Point FFT results are averaged M times to improve accuracy of the result. This block may include other statistical analysis, as well. The FFT result by itself is amplitude spectrum and power spectrum can be calculated by squaring amplitude FFT results. Power is calculated by summing over selected frequency range from averaged FFT result, for example over 20 MHz LTE channel(s) or summing up corresponding number of FFT bins. The output of the Averaging 1-M count 508 is passed to a state machine 510 that performs the power measurement and LBT measurement. The output of the state machine 510 is passed to a TX DFE Functionality 514, which may include at least one of a CCA information, a timing information for the transmission when to transmit or transmission on/off signal. The output from state machine 510 may be one of a digital signal, an analog signal, a software indication or an interrupt signal. The output of the TX DFE functionality 514 is passed to a digital to analog convert (DAC) for converting the digital signal to an analog signal. The analog signal is passed via analog transmitter 514 the antenna 500 for transmission. The TX DFE 514 is a transmitter digital front-end which includes a digital filtering, an automatic power control, timing control(s) for the transmission signal and other needed digital signal processing for the transmission.

Figure 6:
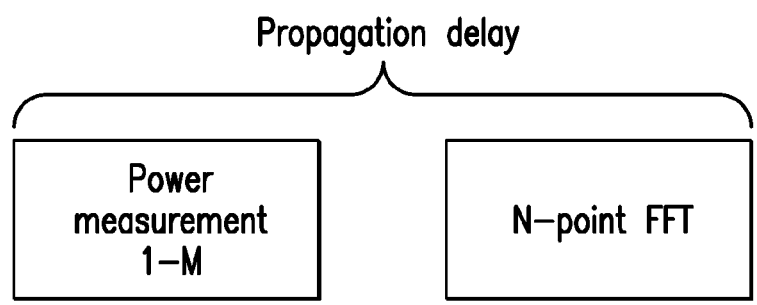
FIG. 6 illustrates a FFT timing budget in accordance with exemplary embodiments.

FIG. 6 illustrates an embodiment of a timing budget definition for filter based and FFT based method. The timing budget may specify that the N-point FFT, M time averaging, and power measurement be performed within the propagation delay time. A conventional filter based approach propagation delay is typically ~2.7 us or even up to 22 us. FFT based method is much faster and more efficient to implement as shown in the figures. Propagation delay with FFT based method may be <1 us, which means that even most stringent timing budget could be fulfilled as shown in FIG. 4. The number of averaging M may be a fixed value or it may be changed, also during the operation. Furthermore, other statistical analysis may be applied to the M signal samples like mean value of the samples, standard deviation of M samples, quantiles of the M samples. These other statistical measures can be used as a metric for threshold comparison and for each statistical measure there is own threshold value.

Figure 7:
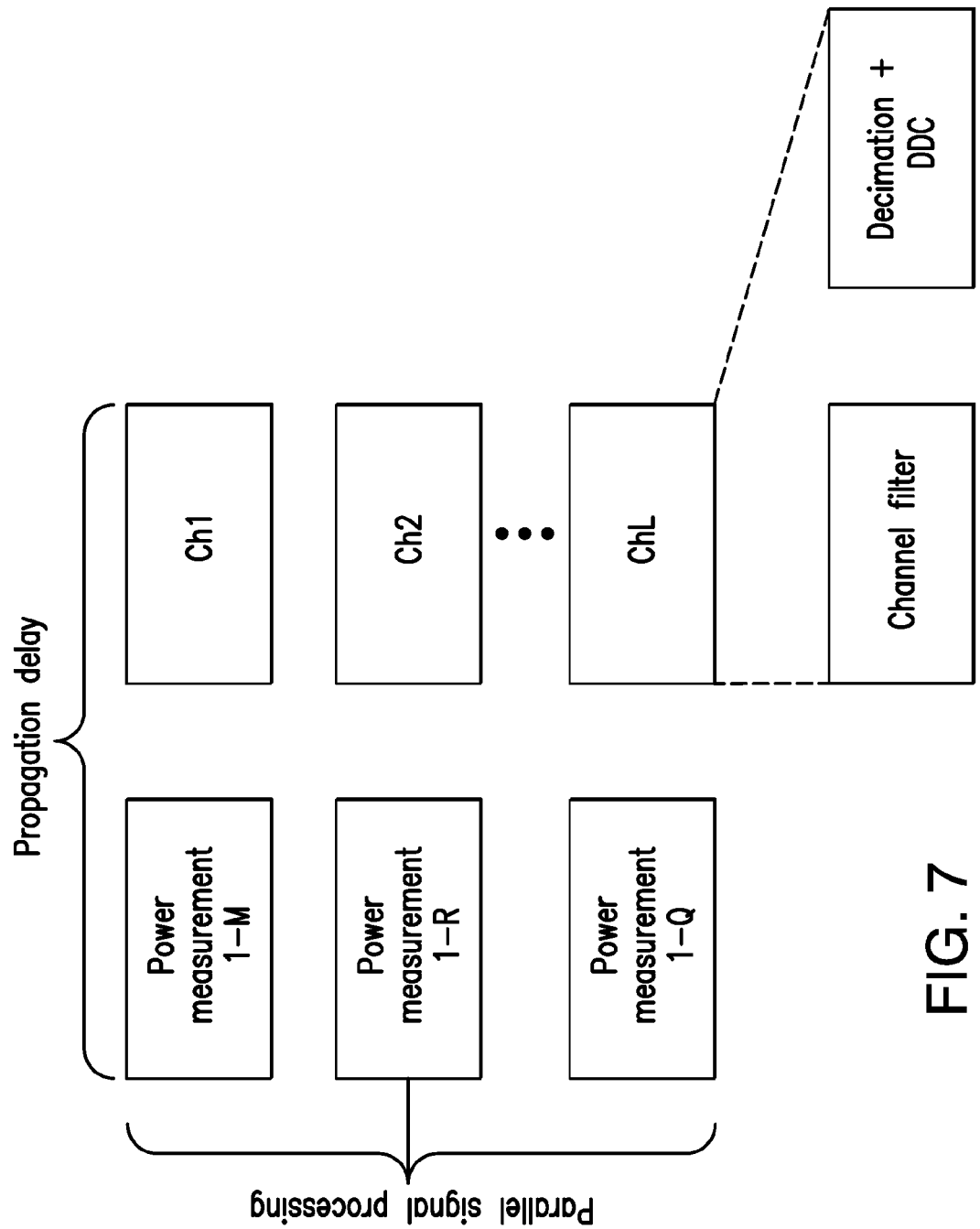
FIG. 7 illustrates a FFT timing budget in accordance with exemplary embodiments.

FIG. 7 illustrates an embodiment of a timing budget for multiple channels. As illustrated in FIG. 7, the FFT may be performed in parallel for multiple channels (e.g., Ch1-Ch-L) along with an averaging and power measurement for each channel within the propagation delay. The channel block Ch include digital signal processing for received signal e.g. a channel filter and DDC (Digital Down Conversion) functionality so that a signal at different radio channel is converted to base band for easier digital processing e.g. FFT purposes. Each of channels Ch1-ChL may have different number of samples which are used for the spectral analysis. For example for Ch1 M samples are used and R and Q samples are used for Ch2 and Ch L, respectively. The channels illustrated in FIG. 7 may each be different radio channels at one radio band or those may be at different frequency bands or those may be at overlapping spectrums. Furthermore, the two or more channels illustrated in FIG. 7 may be the same channel so that the FFT may be performed more than once for the same channel to improve accuracy.

Figure 8:
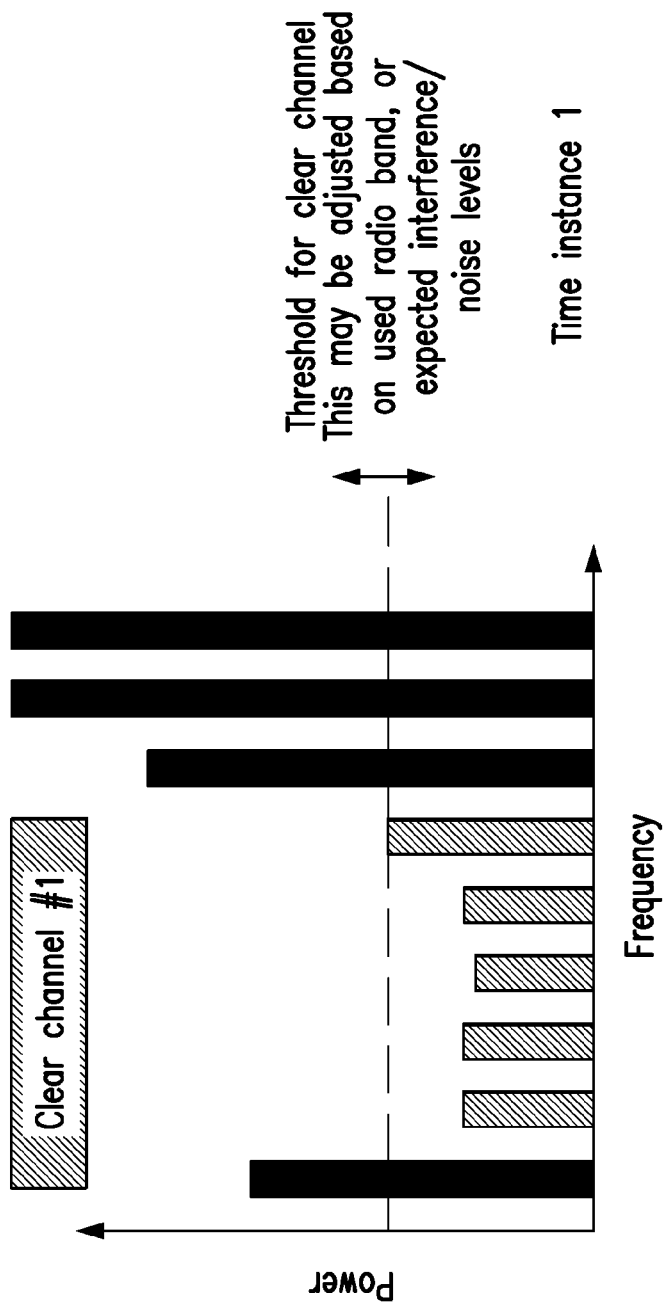
FIG. 8 illustrates a power spectrum in accordance with exemplary embodiments.
Figure 9:
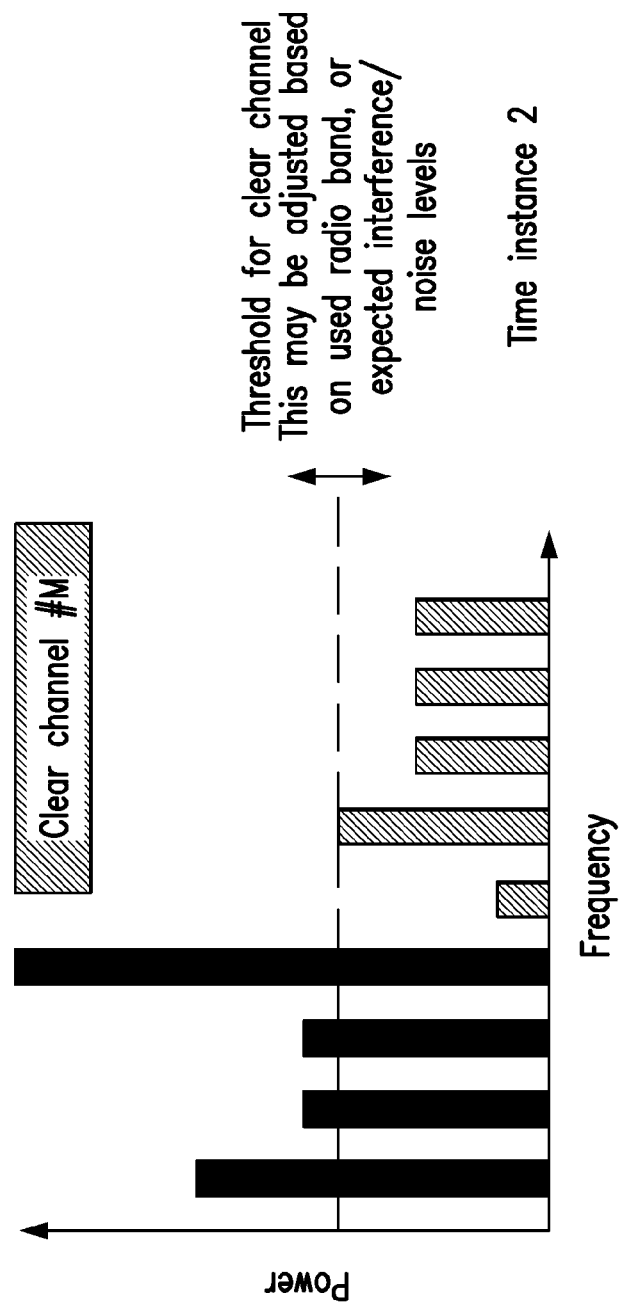
FIG. 9 illustrates a power spectrum in accordance with exemplary embodiments.

FIGS. 8 and 9 illustrate a power spectrum at two different time instances. In FIG. 8, a set of frequency bins are below a power threshold, which may be altered based on used radio band or expected background noise/interference level at the radio band. These frequency bins may correspond to one or more channels. Since these frequency bins are below the threshold, the LBT algorithm may determine that the channels corresponding to these frequency bins are clear. FIG. 9 illustrates a second time instance in which a different set of frequency bins are below the power threshold. The frequency bins in FIG. 9 may represent a different set of channels that are clear at the second time instance.

Figure 10:
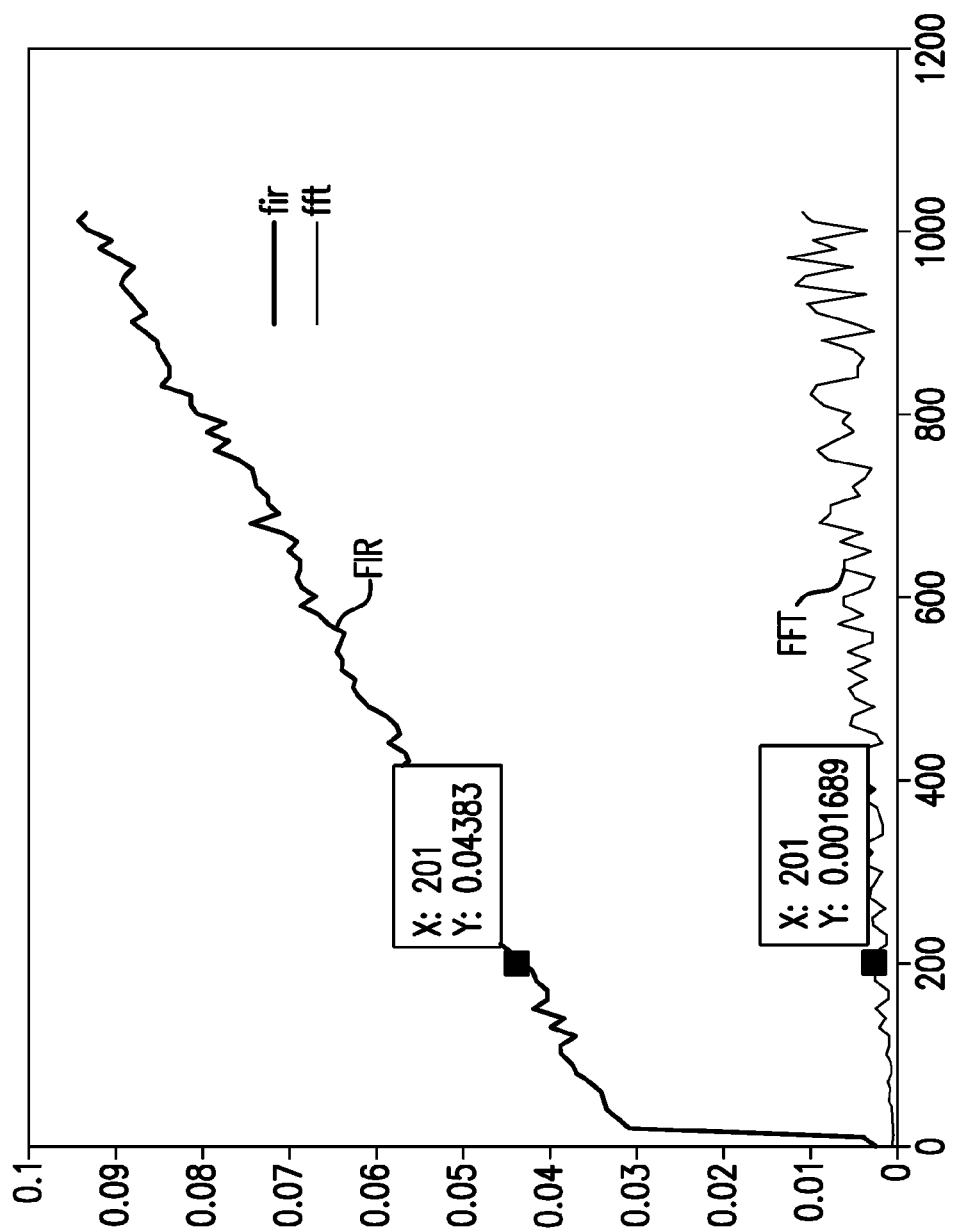
FIG. 10 illustrates a processing time chart according to exemplary embodiments.

FIG. 10 illustrates a comparison between FIR filter and FFT processing. The X-axis is the number of taps for a FIR filter and a number of bins for the FFT processing, and the y-axis is relative processing time. As illustrated in FIG. 10, the FFT is much faster than the FIR approach. As an example, when the uplink channel filter length is 192 taps at 30.72 MHz, by doing straightforward comparison at x=200, the FFT is 26 times faster than FIR filter.

Figure 11:
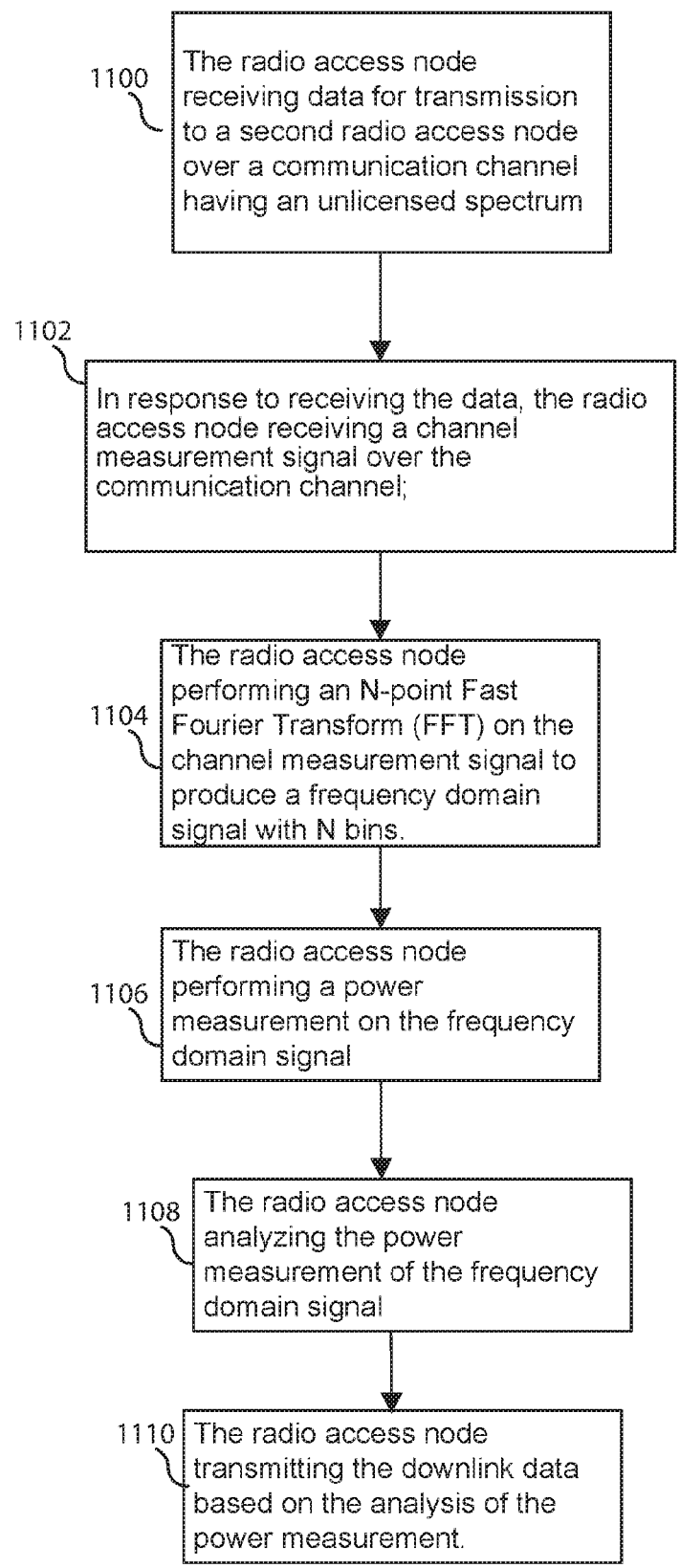
FIG. 11 illustrates a process according to exemplary embodiments.

FIG. 11 illustrates an embodiment of a process performed by a radio access node. The process may start at step 1100 where the radio access node receives downlink data for transmission to a user equipment (UE) over a communication channel having an unlicensed spectrum. In step 1102, in response to receiving the data, the radio access node receives a channel measurement signal over the communication channel. In step 1104, the radio access node performs an N-point Fast Fourier Transform (FFT) on the channel measurement signal to produce a frequency domain signal with N bins. In step 1106, the radio access node performs a power measurement on the frequency domain signal. In step 1108, the radio access node analyzes the power measurement of the frequency domain signal. In step 1110, the radio access node transmits the data based on the analysis of the power measurement.

In some embodiments, the N-point FFT is performed a predetermined number of times, and the frequency domain signal is an average of the predetermined number of times the N-point FFT is performed. In some embodiments, the analyzing the power measurement of the frequency domain signal includes performing a statistical analysis process to the frequency domain signal. Furthermore, other statistical analysis may be applied to the M signal samples like mean value of the samples, standard deviation of M samples, quantiles of the M samples. These other statistical measures can be used as a metric for threshold comparison and for each statistical measure there is own threshold value. The statistical analysis with average value and standard deviation may be done with threshold value and if average value is more than e.g. three standard deviation units away from the threshold value then with a good statistical confidence the channel may be declared as a free channel. In some embodiments, the data is transmitted in response to determining that the analyzing of the power measurement on the frequency domain signal indicates that a predetermined number of bins corresponding to a channel is clear of transmissions.

In some embodiments, the predetermined number of bins corresponding to a channel is clear of transmissions when the power of the predetermined number of bins is below a predetermined threshold. In some embodiments, wherein the N-point FFT is performed in parallel for a plurality of channels. In some embodiments, the radio access node is a radio base station, a femto base station, a mobile station, a CPE (Customer premises Equipment), an access point, or a radio relay. In some embodiments, the radio access node operates according to one of the following standards: Wifi (802.11), LTE, LTE-U, LTE-LAA, MuLTEfire, WiMAX, Bluetooth, and ZigBee.

Figure 12:
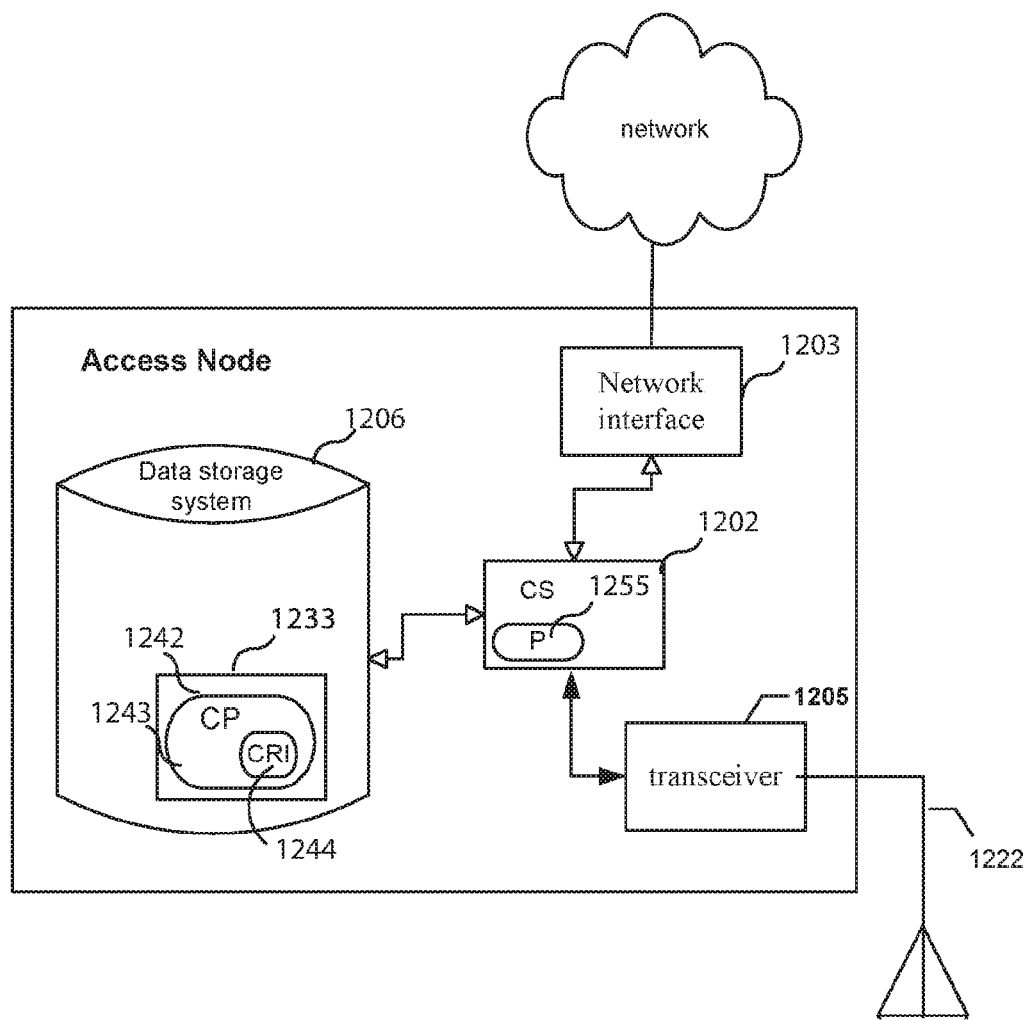
FIG. 12 illustrates a radio access node according to exemplary embodiments.

FIG. 12 illustrates a block diagram of an exemplary access node, such as node 306 shown in FIG. 3. As shown in FIG. 12, the access node 306 may include: a data processing system 1202, which may include one or more microprocessors and/or one or more circuits, such as an application specific integrated circuit (ASIC), field-programmable gate arrays (FPGAs), and the like; a network interface 1210; a transceiver 1204, and a data storage system 1206, which may include one or more non-volatile storage devices and/or one or more volatile storage devices (e.g., random access memory (RAM)). According to some embodiments, the data processing system 1202 may comprise a control unit used for selection of transmission parameters.

In embodiments where data processing system 1202 includes a microprocessor, computer readable program code (CRPC) 1208 may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 1202 to perform steps described above (e.g., steps described above with reference to the flow charts shown above). In other embodiments, the access node 306 is configured to perform steps described herein without the need for code. That is, for example, data processing system 1202 may consist merely of one or more ASICs. Hence, the features of the embodiments described herein may be implemented in hardware and/or software. For example, in particular embodiments, the functional components of the base station described above may be implemented by data processing system 1202 executing computer instructions, by data processing system 1202 operating independent of any computer instructions, or by any suitable combination of hardware and/or software.

Figure 13:
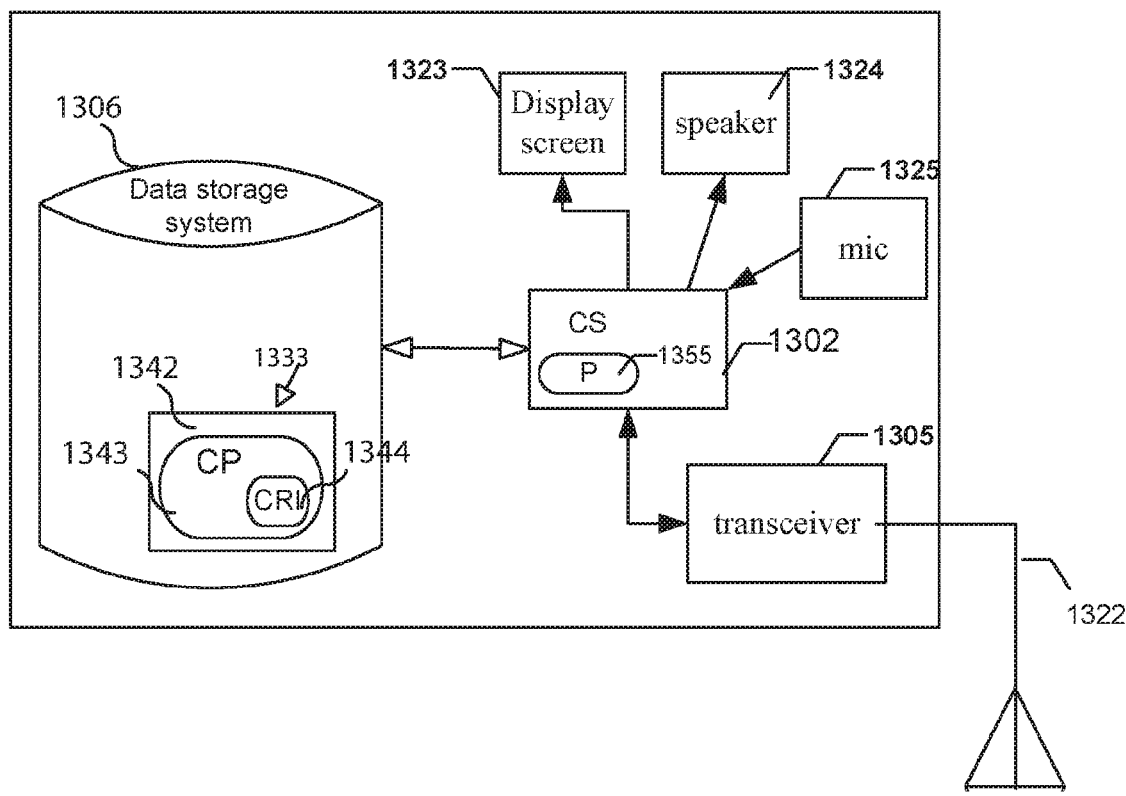
FIG. 13 illustrates a UE according to exemplary embodiments.

FIG. 13 is a block diagram of UE according to some embodiments. As shown in FIG. 13, UE may include or consist of: a computer system (CS) 1302, which may include one or more processors 1355 (e.g., a general purpose microprocessor) and/or one or more circuits, such as an application specific integrated circuit (ASIC), field-programmable gate arrays (FPGAs), a logic circuit, and the like; a transceiver 1305, coupled to an antenna, 1322 for transmitting and receiving data wireless; and a data storage system 1306, which may include one or more non-volatile storage devices and/or one or more volatile storage devices (e.g., random access memory (RAM)). In embodiments where UE includes a processor 1355, a computer program product (CPP) 1333 may be provided. CPP 1333 includes or is a computer readable medium (CRM) 1342 storing a computer program (CP) 1343 comprising computer readable instructions (CRI) 1344. CRM 1342 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1344 of computer program 1343 is configured such that when executed by computer system 1302, the CRI causes the UE to perform steps described above (e.g., steps described above with reference to the flow charts and message flows shown in the drawings). In other embodiments, UE may be configured to perform steps described herein without the need for a computer program. That is, for example, computer system 1302 may consist merely of one or more ASICs. Hence, the features of the embodiments described herein may be implemented in hardware and/or software. As shown in FIG. 13, UE may include: a display screen 1333, a speaker 1324, and a microphone ("mica"), all of which are coupled to CS 1302.

Although terminology from 3GPP has been used in this disclosure to exemplify the exemplary embodiments, one of ordinary skill in the art would understand this as not limiting the scope of the present embodiments to only the aforementioned system. Other wireless systems, including LTE, LTE-A, WiMax, UMB and GSM, may also benefit from exploiting the ideas covered within this disclosure.

Furthermore, the terminology such as NodeB and UE are non-limiting and does in particular do not imply a certain hierarchical relation between the two; in general "NodeB" could be considered as device 1 and "UE" device 2, and these two devices communicate with each other over some radio channel.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that, although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

LTE-U LTE in Unlicensed
LBT Listen Before Talk
LAA License Assisted Access
DFE Digital Front End
RBS Radio Base Station
RX Reception
TX Transmission

The invention claimed is:

1. A method performed in a first wireless communication device (WCD), the method comprising:
   the first WCD receiving data for transmission to a second WCD over a communication channel having an unlicensed spectrum;
   the first WCD receiving a channel measurement signal over the communication channel;
   the first WCD performing an N-point Fast Fourier Transform (FFT) on the channel measurement signal to produce a frequency domain signal with N bins;
      wherein the N-point FFT is performed a predetermined number of times, and the frequency domain signal is an average of the predetermined number of times the N-point FFT is performed;
   the first WCD performing a power measurement on the frequency domain signal;
   the first WCD analyzing the power measurement of the frequency domain signal; and
   after the first WCD analyzes the power measurement of the frequency domain signal, the first WCD transmitting the data to the second WCD based on the analysis of the power measurement, wherein the data is transmitted in response to determining that the analyzing of the power measurement on the frequency domain signal indicates that a predetermined number of bins corresponding to a channel is clear of transmissions.

2. The method of claim 1, wherein the analyzing the power measurement of the frequency domain signal includes performing a statistical analysis process is applied to the frequency domain signal.

3. The method of claim 1, wherein the predetermined number of bins corresponding to a channel is clear of transmissions when the power of the predetermined number of bins is below a predetermined threshold.

4. The method of claim 1, wherein the N-point FFT is performed in parallel for a plurality of channels.

5. The method of claim 1, wherein the first WCD is a radio base station, a femto base station, a mobile station, a CPE (Customer premises Equipment), an access point, or a radio relay.

6. The method of claim 1, wherein the first WCD operates according to one of the following standards: Wifi, LTE, LTE-U, LTE-LAA, MuLTEfire, WiMAX, Bluetooth, and ZigBee.

7. A first wireless communication device (WCD) comprising:
   a processor;
   a non-transitory computer readable medium coupled to the processor, said computer readable medium containing instructions executable by the processor, wherein the first WCD is operative to:
   receive data for transmission to a second WCD over a communication channel having an unlicensed spectrum;
   receive a channel measurement signal over the communication channel;
   perform an N-point Fast Fourier Transform (FFT) on the channel measurement signal to produce a frequency domain signal with N bins,
      wherein the N-point FFT is performed a predetermined number of times, and the frequency domain signal is an average of the predetermined number of times the N-point FFT is performed;
   perform a power measurement on the frequency domain signal;
   analyze the power measurement of the frequency domain signal; and
   after analyzing the power measurement of the frequency domain signal, transmit to the second WCD the data based on the analysis of the power measurement, wherein the data is transmitted in response to determining that the analyzing of the power measurement on the frequency domain signal indicates that a predetermined number of bins corresponding to a channel is clear of transmissions.

8. The first WCD of claim 7, wherein the analyzing the power measurement of the frequency domain signal includes performing a statistical analysis process is applied to the frequency domain signal.

9. The first WCD of claim 7, wherein the predetermined number of bins corresponding to a channel is clear of transmissions when the power of the predetermined number of bins is below a predetermined threshold.

10. The first WCD of claim 7, wherein the N-point FFT is performed in parallel for a plurality of channels.

11. The first WCD of claim 7, wherein the first WCD is a radio base station, a femto base station, a mobile station, a CPE (Customer premises Equipment), an access point, or a radio relay.

12. The first WCD of claim 7, wherein the first WCD operates according to one of the following standards: Wifi, LTE, LTE-U, LTE-LAA, MuLTEfire, WiMAX, Bluetooth, and ZigBee.

\* \* \* \* \*